United States Patent [19]
Wu

[11] Patent Number: 5,213,550
[45] Date of Patent: May 25, 1993

[54] VARIABLE SPEED-TYPE BICYCLE CHAIN RING ASSEMBLY

[76] Inventor: Chuen-Fwu Wu, No. 12, Lane 18, Kuo-Chi Erh Rd., Ta-Hu Li, Ying-Ko Chen, Taipei Hsien, Taiwan

[21] Appl. No.: 824,612

[22] Filed: Jan. 23, 1992

[51] Int. Cl.$^5$ ............................................. F16H 55/12
[52] U.S. Cl. ...................................... 474/160; 474/164
[58] Field of Search ................. 474/152, 158, 160, 164

[56] References Cited

U.S. PATENT DOCUMENTS

| | | | |
|---|---|---|---|
| 4,259,880 | 4/1981 | Ueno | 474/160 X |
| 4,384,865 | 5/1983 | Ueno | 474/160 |
| 4,741,724 | 5/1988 | Wang | 474/164 X |

FOREIGN PATENT DOCUMENTS

| | | | |
|---|---|---|---|
| 892561 | 10/1953 | Fed. Rep. of Germany | 474/160 |
| 52664 | 5/1945 | France | 474/160 |
| 704207 | 2/1954 | United Kingdom | 474/160 |

Primary Examiner—Terry Lee Melius
Assistant Examiner—Roger J. Schoeppel
Attorney, Agent, or Firm—Townsend & Townsend Khourie & Crew

[57] ABSTRACT

A variable speed-type bicycle chain ring assembly includes a hub member having a plurality of angularly spaced radial arms which are stepped at a front side of the hub member so as to form at least two mounting sections that are spaced at different radial distances from a center point of the hub member. The mounting sections of the radial arms are circumferentially aligned. The thickness of the mounting sections increases from an outermost end to an innermost end of the radial arms. The bicycle chain ring assembly further includes at least two concentric sprocket ring members of different diameters. The sprocket ring members are mounted on the hub member at a respective one of the mounting sections.

4 Claims, 3 Drawing Sheets

VARIABLE SPEED-TYPE BICYCLE CHAIN RING ASSEMBLY

BACKGROUND OF THE INVENTION

1. Field of the Invention

The invention relates to a bicycle chain ring assembly, more particularly to a variable speed-type bicycle chain ring assembly which has a lower manufacturing cost than the prior art.

2. Description of the Related Art

FIG. 1 is an illustration of a conventional single speed-type bicycle chain ring. The bicycle chain ring comprises a sprocket (10) to be provided on a crank pin (A) of a crank (12). The sprocket (10) is usually stamped from a metal plate (not shown). A high scrap rate is usually obtained when fabricating the sprocket (10), thereby increasing its manufacturing cost.

Referring to FIG. 2, a conventional variable speed-type bicycle chain ring assembly is shown to comprise a hub member (13) and a pair of sprocket ring members (14, 15). The hub member (13) is to be secured to a crank (not shown). The sprocket ring members (14, 15) have different diameters and are provided with a plurality of angularly spaced inward projections (141, 151). The inward projections (141, 151) of the sprocket ring members (14, 15) are secured on two sides of the hub member (13) adjacent to the distal ends of the radial arms (131). As with the sprocket (10) shown in FIG. 1, the sprocket ring members (14, 15) are also stamped from a metal plate. Fabrication of the sprocket ring members (14, 15) yields high scrap metal rates (i.e, the material efficiency is very low), thereby increasing the manufacturing cost of the bicycle chain ring assembly.

SUMMARY OF THE INVENTION

Therefore, the objective of the present invention is to provide a variable speed-type bicycle chain ring assembly which has a manufacturing cost that is lower than the prior art.

Accordingly, the preferred embodiment of a variable speed-type bicycle chain ring assembly of the present invention comprises: a hub member having a plurality of angularly spaced radial arms which are stepped at a front side of the hub member so as to form at least two mounting sections that are spaced at different radial distances from a center point of the hub member, said mounting sections of the radial arms being in circumferential alignment, the thickness of the mounting sections increasing from an outermost end to an innermost end of the radial arms; and at least two concentric sprocket ring members of different diameters, said sprocket ring members being mounted on the hub member at a respective one of the mounting sections. The sprocket ring members may be fabricated as concentric one-piece rings of different diameters or as a plurality of arcuate sprocket strips.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 3:
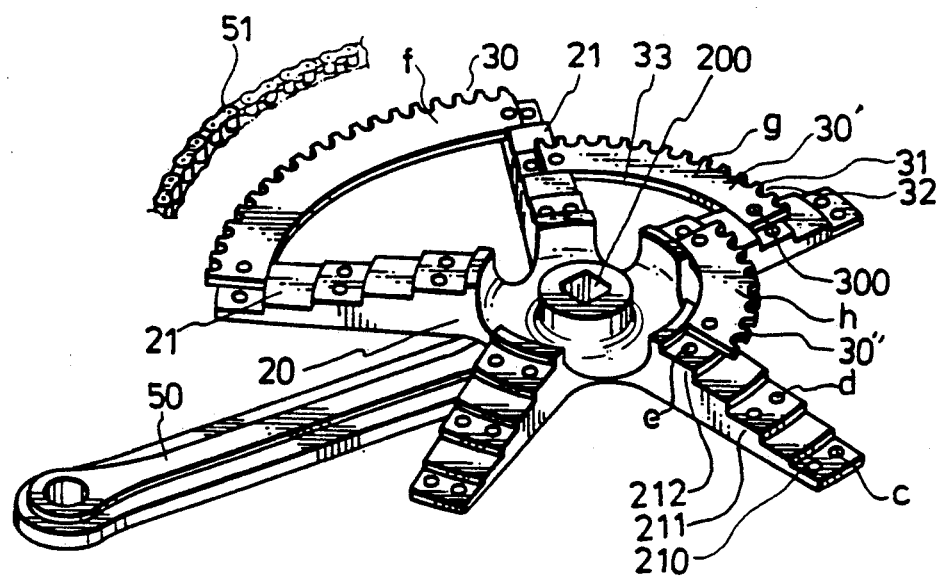
FIG. 3 is a fragmentary perspective view of the first preferred embodiment of a bicycle chain ring assembly according to the present invention.

Referring to FIG. 3, the first preferred embodiment of a variable speed-type bicycle chain ring assembly according to the present invention is shown to comprise a hub member (20) which has a central opening (200) and a plurality of angularly spaced radial arms (21). A crank (50) engages the hub member (20) at the central opening (200). The radial arms (21) are stepped at the front side of the hub member (20) so as to form at least two mounting sections which are spaced at different radial distances from the central opening (200) of the hub members (20). In the first preferred embodiment, there are five radial arms (21), and each of the radial arms (21) is formed with three mounting sections (210, 211, 212) which are in circumferential alignment. The thickness of the mounting sections (210, 211, 212) increases from the outermost end of the radial arm (21) to the innermost end of the radial arms (21). Each of the mounting sections (210, 211, 212) is also formed with a pair of mounting holes (c, d, e).

Sprocket ring members (30, 30', 30'') are mounted on the radial arms (21) of the hub member (20) at a respective one of the mounting sections (210, 211, 212). The sprocket ring members (30, 30', 30'') are concentric and are of different diameters. The sprocket ring members (30, 30', 30'') respectively comprise a plurality of arcuate sprocket strips (f, g, h) [only one sprocket strip is shown for each sprocket ring members (30, 30', 30'')]. Each sprocket strip (f, g, h) has a longer curved edge (31) formed with gear teeth (32) and a shorter curved edge (33) which is free from any inward projection. Each end of the sprocket strip (f, g, h) is provided with a mounting hole (300) to permit mounting of the sprocket strips (f, g, h) between two adjacent radial arms (21) at the mounting holes (c, d, e) of the corresponding mounting section (210, 211, 212). A sprocket chain (51) engages the gear teeth (32) of a selected one of the sprocket ring members (30, 30', 30'') and is secured to the same by means of conventional methods.

Figure 1:
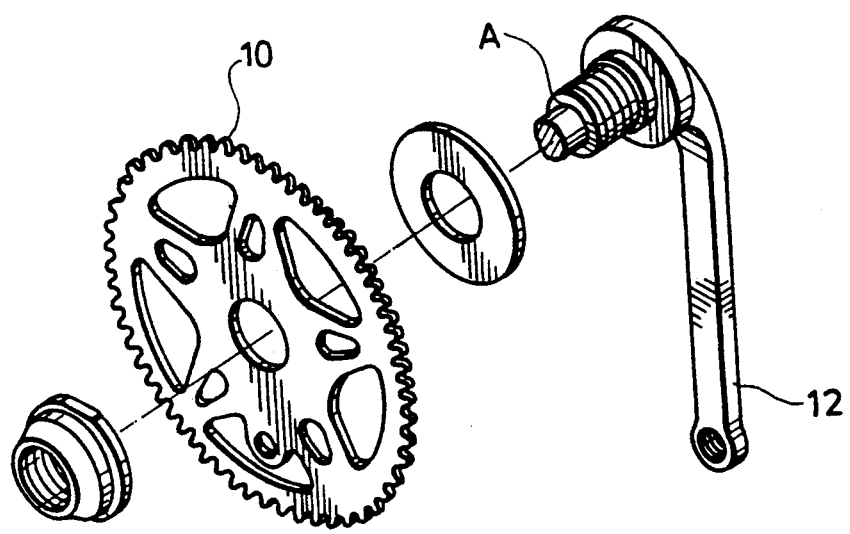
FIG. 1 is an illustration of a first conventional bicycle chain ring.
Figure 2:
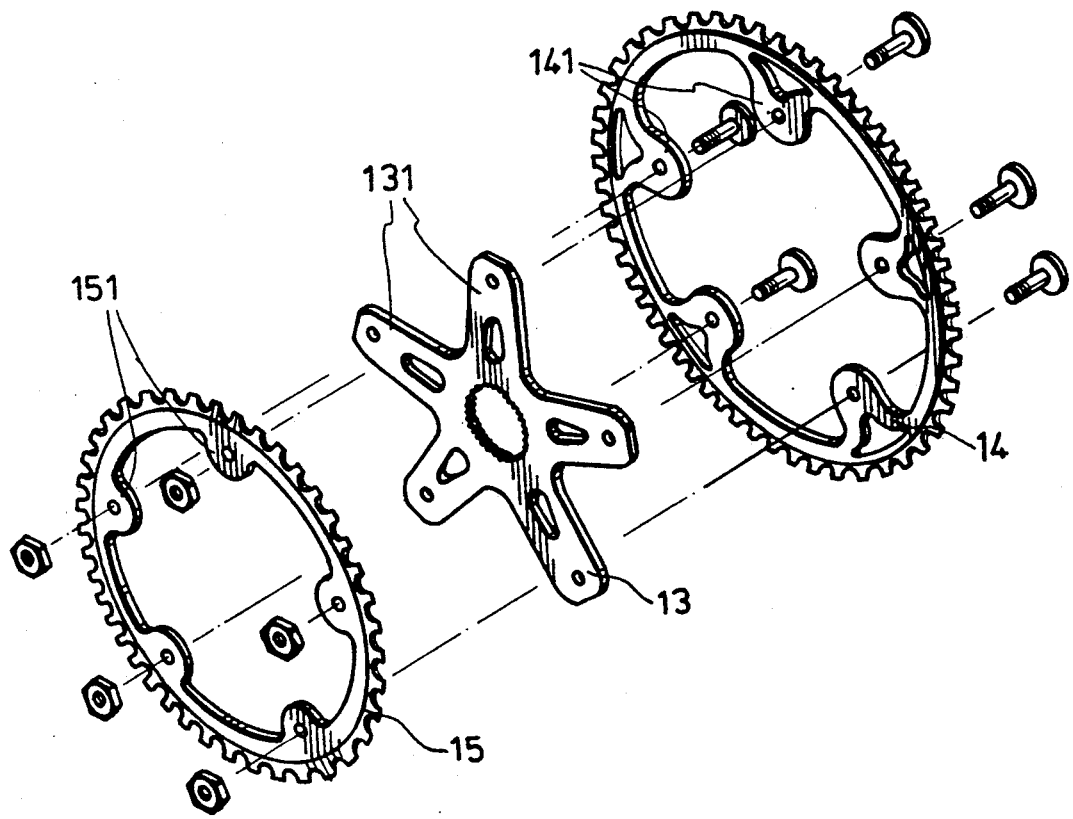
FIG. 2 illustrates a second conventional bicycle chain ring assembly.
Figure 4:
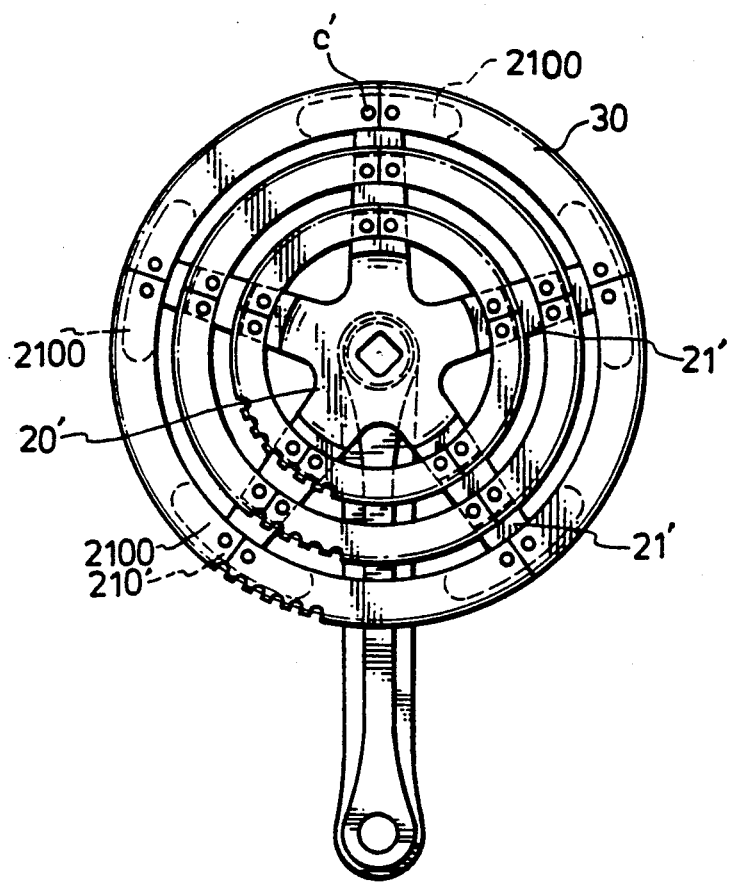
FIG. 4 is a front view of the second preferred embodiment of a bicycle chain ring assembly of the present invention illustrating its assembly.

Referring to FIG. 4, the second preferred embodiment of a bicycle chain ring assembly of the present invention is shown to be substantially similar to the first preferred embodiment. The main difference between the two embodiments is that each of the radial arms (21') of the hub member (20') of the second preferred embodiment is provided with a circumferentially extending flange (2100) at the outermost mounting section (210'). The flanges (2100) are each provided with a pair of mounting holes (c') so as to secure the sprocket ring member (30) thereto. (Like elements are indicated by like numerals throughout the disclosure).

Figure 5:
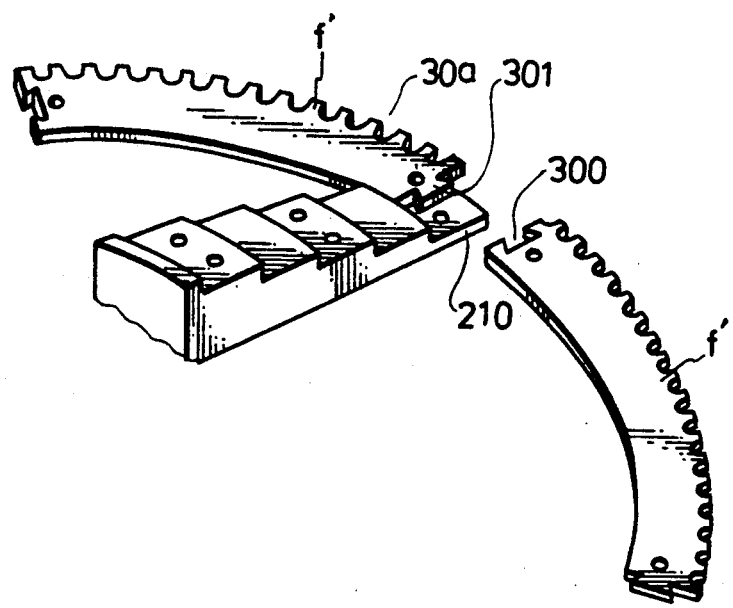
FIG. 5 is a fragmentary perspective view of the third preferred embodiment of a bicycle chain ring assembly according to the present invention.

Referring to FIG. 5, each of the sprocket strips (f') of the sprocket ring members (30a) may be formed with a dovetail engaging groove (300) on one end and a dovetail engaging flange (301) on the other end. The dovetail engaging flange (301) of one sprocket strip (f') can be received in the dovetail engaging groove (300) of an adjacent one of the sprocket strips (f').

Figure 6:
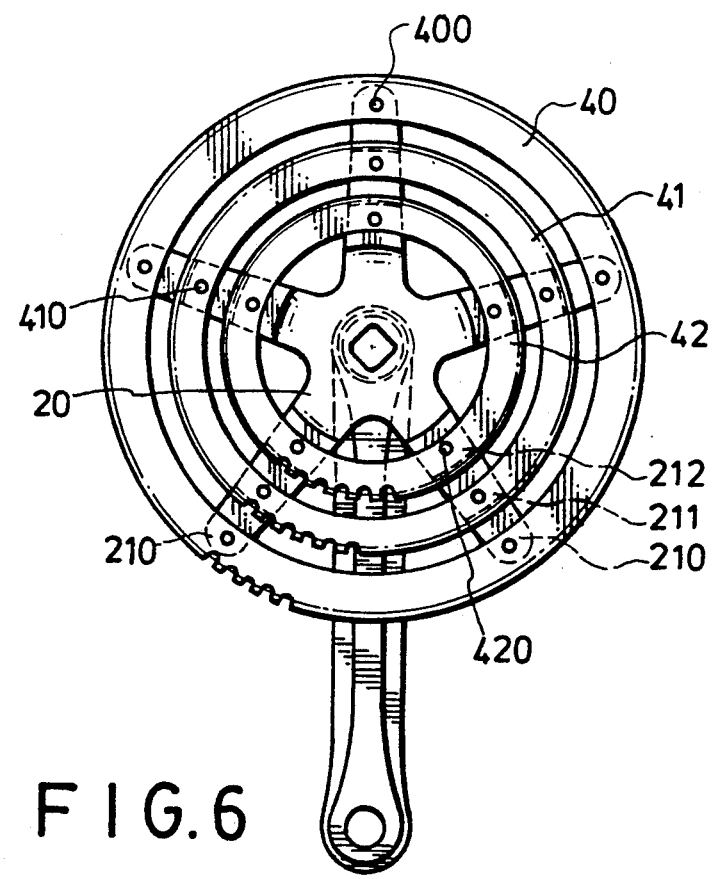
FIG. 6 is a front view of the fourth preferred embodiment of a bicycle chain ring assembly of the present invention illustrating its assembly.

Referring to FIG. 6, the sprocket ring members (40, 41, 42) may be formed as concentric one-piece rings of different diameters. Each of the sprocket ring members (40, 41, 42) is provided with a plurality of mounting holes (400, 410, 420) for securing the same onto the radial arms (21) of the hub member (20).

Note that fabrication of the sprocket ring members of the bicycle chain ring assembly of the present invention results in relatively low scrap metal loss since the sprocket ring members can be concentrically stamped on a metal plate in a single stamping operation. The manufacturing cost of the bicycle chain ring assembly of the present invention is thus lower than the prior art.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A variable speed-type bicycle chain ring assembly, comprising:

a hub member having a plurality of angularly spaced radial arms which are stepped at a front side of said hub member so as to form at least two mounting sections that are spaced at different radial distances from a center point of said hub member, said mounting sections of said radial arms being in circumferential alignment, the thickness of said mounting sections increasing from an outermost end to an innermost end of said radial arms; and at least two concentric sprocket ring members of different diameters, said sprocket ring members being mounted on said hub member at a respective one of said mounting sections.

2. The variable speed-type bicycle chain ring assembly as claimed in claim 1, wherein each of said sprocket ring members comprises a plurality of arcuate sprocket strips.

3. The variable speed-type bicycle chain ring assembly as claimed in claim 2, wherein each of said sprocket strips has one end formed with an engaging groove and another end formed with an engaging flange received in said engaging groove of an adjacent one of said sprocket strips.

4. The variable speed-type bicycle chain ring assembly as claimed in claim 3, wherein said engaging groove and said engaging flange are dovetailed in shape.

* * * * *